Figures 1, 2:
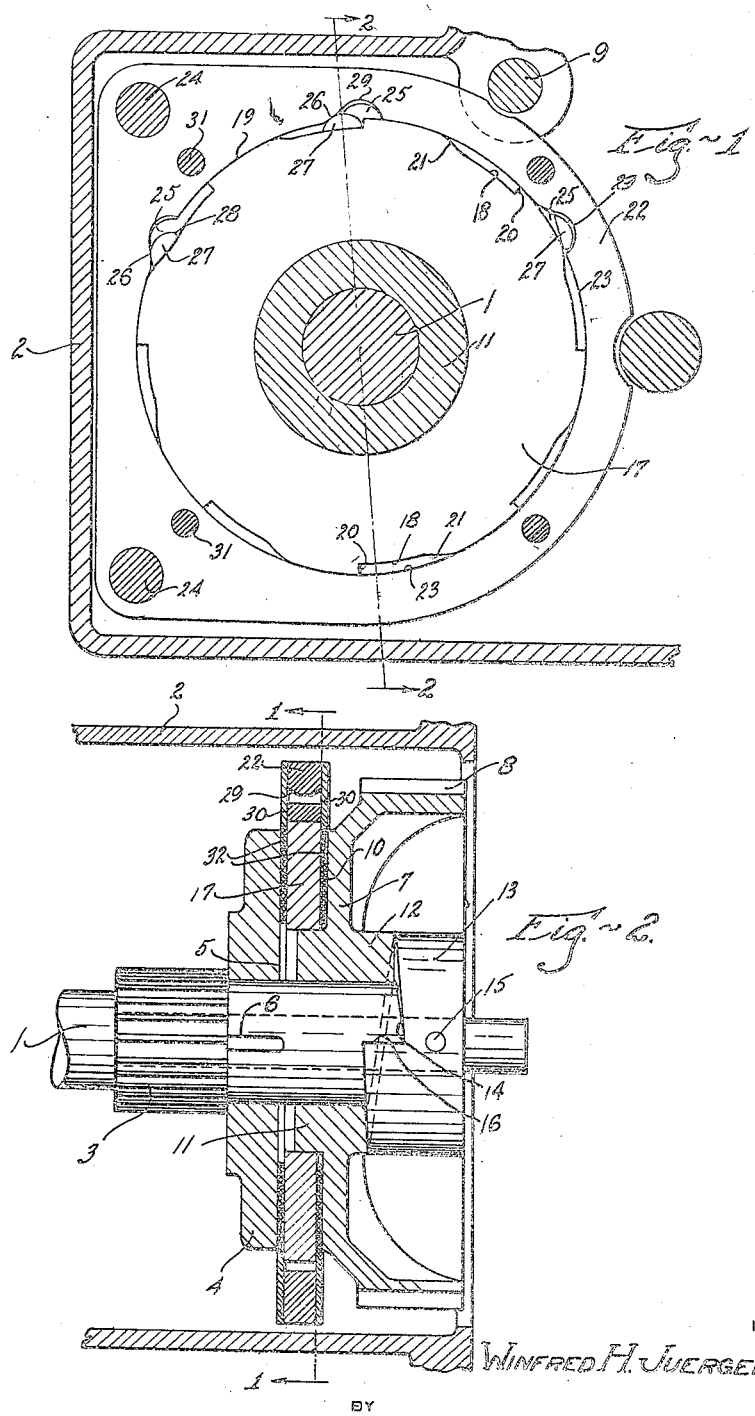

July 12, 1932.  W. H. JUERGENS  1,867,409
LOAD BRAKE FOR HOISTS
Filed Aug. 18, 1930

INVENTOR
WINFRED H. JUERGENS
BY
Birkett, Hyde, Higley + Meyers
ATTORNEYS

Patented July 12, 1932

1,867,409

UNITED STATES PATENT OFFICE

WINFRED H. JUERGENS, OF CLEVELAND, OHIO, ASSIGNOR TO THE EUCLID CRANE & HOIST COMPANY, OF EUCLID, OHIO, A CORPORATION OF OHIO

LOAD BRAKE FOR HOISTS

Application filed August 18, 1930. Serial No. 476,076.

This invention relates to load brakes for hoisting apparatus, and more particularly embraces mechanism whereby hoisting and lowering operations are free, but the parts are locked whenever the driving force is terminated.

The invention has to do with specific details of such a mechanism as will appear. Briefly the invention includes improved ratchet means which act positively, and improved brake means which act frictionally but in particular cooperative relation with the ratchet means; and the objects of this invention are, therefore, improvements in such parts and their arrangement.

The exact nature of the invention, together with further objects and advantages thereof will be apparent from the following description taken in connection with the accompanying drawing, in which Fig. 1 is a sectional view of apparatus illustrative of my invention, transverse of the brake shaft thereof, parts of the ratchet mechanism appearing in elevation; and Fig. 2 is a sectional view of the same taken as in the longitudinal plane of line 2—2, Fig. 1, the plane of Fig. 1 being indicated in Fig. 2 by the line 1—1.

With reference now to the drawing, the brake shaft 1 is suitably mounted for rotation in bearings not shown but carried by a housing 2 for the parts which appear. Secured upon the shaft 1 is a pinion 3 which meshes with the first of a train of gears for driving the hoisting drum, these parts not appearing as forming no part of this invention. Adjacent the pinion 3 and also fixed against any movement on the shaft 1 is a discoid member 4 presenting a plane face 5. In construction the pinion 3 may be integral with the shaft 1 and the member 4 secured by a key 6. Next upon the shaft 1 is a gear 7. This gear is free to rotate upon the shaft and its teeth 8 may be driven by a pinion upon the shaft 9 of the driving motor for the apparatus. The gear has a circular face 10 opposite the face 5 of the member 4, and a hub portion 11 projecting beyond the face 10. Opposite the hub portion 11 is another hub portion 12 having its end face finished to provide a helical cam. A cam member 13 having end face 14 cut to cooperate with the cam face of the hub 12, is secured upon the shaft 1 as conventionally indicated by the pin 15. The cam faces of the parts include shoulders as at 16 and the parts are so arranged that when the gear 7 is driven right-hand Fig. 1, which is the hoisting direction, the friction between the gear and the member 13 will cause the gear to advance along the shaft 1 toward the left Fig. 2, whereas when the gear is operated in reverse or lowering direction, the shoulder 16 will engage the corresponding part of the gear hub 12, to drive the shaft 1 positively left-hand Fig. 1.

Mounted upon the hub 11 of the gear 7 to freely rotate thereon is a ratchet wheel or plate 17. The wheel is, therefore, between the faces 5 and 10, and it extends slightly beyond the peripheral edges of these faces. The wheel has peripherally spaced notches 18 providing teeth 19 correspondingly spaced. The notches are so proportioned and arranged that the teeth 19 are elongated, having arcuate extremities of considerable peripheral length about the wheel as compared with the length of the notches. In other words the aggregate peripheral dimension of the teeth is at least as great as that of the notches, so that the wheel may be considered as having its periphery interrupted by notches rather than as having teeth projecting therefrom. The form of the teeth and notches is such that each tooth presents at one end a square shoulder 20 and at the other a cam surface 21.

In the plane of the ratchet wheel and preferably of substantially equal thickness therewith is an anchor plate 22 having a circular through opening 23 by which the anchor plate may bear upon the teeth 19 of the wheel, so that the latter may freely rotate therewithin. Rotation of the anchor plate, however, is positively prevented by a pair of pins 24 secured in the casing 2 and loosely fitting in openings in the anchor plate for the purpose.

The anchor plate is provided with a number of recesses 25 opening onto the periphery of the ratchet wheel. These recesses are generally semi-circular in form but are elongated somewhat in one direction as at 26. For each recess 25 there is a detent 27 generally of the semi-circular section indicated and coextensive longitudinally of the shaft 1, with the ratchet wheel and anchor plate. Each detent 27 is on one edge finished off as at 28 to provide a flat end face corresponding to the shoulders 20 of the ratchet wheel teeth.

The spacing of the recesses 25 preferably differs from that of the teeth 19, so that as the ratchet wheel rotates the recesses will be passed by teeth in progressive order instead of simultaneously. Thus in the example illustrated the teeth 19 are spaced at 45° about the wheel, while the recesses 25 are separated by 60°; so that registration of a tooth and a recess will occur at every 15° of wheel revolution; and, when the wheel moves right-hand, Fig. 1, the order of registration will be first the middle detent, next the right-hand detent and then the left-hand detent.

It will be obvious that the arrangement is such that the ratchet wheel 17 is free to rotate right-hand Fig. 1, but is positively prevented from reverse or left-hand rotation: as the wheel moves right-hand the detents 27 will be forced into their recesses 25 by the cams 21; dropping, however, into the notches 18 of the wheel as the notches register with the recesses 25; reverse force upon the wheel causing whichever detent 27 happens to be in a notch 18, to jam between the portion 26 of its recess and the shoulder 20 of the adjacent tooth. In this latter detent position, which is that of the uppermost detent Fig. 1, it will be apparent that by virtue of the face 28 of the detent ample bearing is had between the detent and the wheel tooth to resist a great turning force.

These parts will ordinarily run in liquid lubricant. To minimize the coherence between the detents and the anchor plate when the detents are recessed therein, I cut away or chamfer the anchor plate at the recesses as at 29. Thus the contacting area of the parts in such position is decreased and the capillary action of lubricant therebetween correspondingly lessened.

The detents 27 are retained in the assembly by a pair of ring-shaped side plates 30 secured with the anchor plate on its opposite faces as by rivets 31. These side plates extend inwardly beyond the bases of the notches 18 of the ratchet wheel but not quite to the faces 5 and 10.

Between the ratchet wheel and each of these faces, is a ring-shaped disc 32 of friction material. The outer diameter of these discs is such that they are centered each by its side plate 30; and each disc has a central opening of greater diameter than the hub 11 of the gear 7.

Operation will be as follows: Supposing no force applied to the gear 7 by its driving pinion, but force applied to the shaft 1 through its pinion 3 to rotate the shaft left-hand direction Fig. 1—which conditions correspond with a load upon the drum of the hoist but power cut off from the hoist motor— the cam 13 tends to move with the shaft, which forces the gear 7 left-hand, Fig. 2, clamping the ratchet wheel between the brake faces 5 and 10, these parts having the described friction faces 32 therebetween. The ratchet wheel is prevented from left-hand rotation, however, by one of the detents 27 backed by the anchor plate 22. No lowering motion of the shaft 1 therefore takes place, all of the parts remaining stationary.

Suppose the gear 7 be driven by the motor in right-hand or hoisting direction as by application of power to the driving motor. Right-hand rotation of the gear, because of the cam 13, maintains the ratchet wheel 17 frictionally secured with the shaft 1 so that the ratchet wheel rotates therewith, as it is allowed to do by the detents 27.

Suppose now, the parts having been stationary, the gear 7 be driven in the opposite or lowering direction. Immediately the gear moves it frees itself from the cam surface of the member 13 and engages this member by the shoulder 16, positively driving the shaft 1 left-hand Fig. 1. This relative motion of gear and cam frees the ratchet wheel from the braking faces 5 and 10 allowing the ratchet wheel to remain stationary as it is required to do by the controlling detent 27.

Immediately the driving power is withdrawn from the gear 7 the parts are again located as first described.

As the friction facings 32 become worn, allowing the gear 7 to more closely approach the member 4, the action of the parts will be nevertheless as described; and until the friction facings are entirely worn out.

What I claim is:

1. Apparatus of the character described and comprising a rotatable driving member having a hub portion, a circular ratchet plate rotatable upon said hub portion, an anchor plate arranged in the plane of said ratchet plate to bear upon the periphery thereof, a side plate secured with said anchor plate with an inner edge portion overlying the ratchet plate, and a friction disc arranged on the face of said ratchet plate and positioned thereon by said side plate, with a central opening to clear said driving member hub portion.

2. Apparatus of the character described and comprising driving means including a pair of members having opposed driving faces, one of said members having a hub portion extending between the planes of said faces, a circular ratchet plate rotatable upon said hub portion and extending beyond said faces, an anchor plate arranged in the plane of said ratchet plate to bear upon the periphery thereof, side plates upon the faces of said anchor plate with inner edge portions overlying the ratchet plate but not extending between said driving faces, and on each face of the ratchet plate a friction disc positioned thereon by the corresponding side plate and having a central opening to clear said driving member hub portion.

3. In a ratchet mechanism of the character described, a detent, and cooperative anchor means having a recess for receiving said detent, one of said parts being chamfered at its side edges to decrease its area of contact with the other part.

4. Anchor means having a detent-receiving recess, and chamfered at said recess to decrease the area of contact between the anchor means and its detent when the latter is received and thus decrease the coherence resulting from lubricant between the parts.

5. Ratchet mechanism comprising a ratchet wheel, a detent and an anchor plate having a recess for receiving said detent, the ratchet wheel having a tooth with a cam surface for moving the detent into its recess when the wheel is rotated in one direction and providing a square shoulder for abutting the detent to lock the wheel against reverse movement, said detent being generally semicircular but having an end face adapted to bear throughout its area against said shoulder when the wheel is locked.

In testimony whereof I hereby affix my signature.

WINFRED H. JUERGENS.